US009094815B2

(12) United States Patent
Hosono et al.

(10) Patent No.: US 9,094,815 B2
(45) Date of Patent: Jul. 28, 2015

(54) BASE STATION IN MOBILE COMMUNICATION SYSTEM AND WAVE STOPPING METHOD

(75) Inventors: Hiroyuki Hosono, Chiyoda-ku (JP);
Takefumi Yamada, Chiyoda-ku (JP);
Hidehiko Oyane, Chiyoda-ku (JP);
Tsutomu Sugaya, Chiyoda-ku (JP);
Yasuhiro Kawabe, Chiyoda-ku (JP);
Masayuki Matsubara, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/119,054

(22) PCT Filed: May 30, 2012

(86) PCT No.: PCT/JP2012/064002
§ 371 (c)(1),
(2), (4) Date: Nov. 20, 2013

(87) PCT Pub. No.: WO2012/169414
PCT Pub. Date: Dec. 13, 2012

(65) Prior Publication Data
US 2014/0148121 A1 May 29, 2014

(30) Foreign Application Priority Data
Jun. 7, 2011 (JP) ................................. 2011-127507

(51) Int. Cl.
*H04W 36/00* (2009.01)
*H04W 8/22* (2009.01)
(Continued)

(52) U.S. Cl.
CPC ............ *H04W 8/22* (2013.01); *H04W 8/24* (2013.01); *H04W 8/245* (2013.01); *H04W 24/02* (2013.01);
(Continued)

(58) Field of Classification Search
CPC .......... H04W 8/24; H04W 8/245; H04W 8/26
USPC ............ 455/404.1, 414.1, 418, 419, 420, 423
See application file for complete search history.

(56) References Cited

U.S. PATENT DOCUMENTS

2001/0034247 A1* 10/2001 Namiki .................... 455/558
2003/0143959 A1* 7/2003 Harris et al. ................ 455/77
(Continued)

FOREIGN PATENT DOCUMENTS

JP 9 282561 10/1997
JP 10 294807 11/1998
(Continued)

OTHER PUBLICATIONS

Japanese Office Action Issued Sep. 25, 2012 in Japanese Application No. 2011-127507 Filed Jun. 7, 2011 (with English translation).
(Continued)

*Primary Examiner* — Khalid Shaheed
(74) *Attorney, Agent, or Firm* — Oblon, McClelland, Maier & Neustadt, L.L.P.

(57) ABSTRACT

A base station in a mobile communication system transmits and receives wireless signals with a user apparatus in a cell; in the case where the base station is connected to a communication network through a router, obtains an address of the router; periodically receives time information from a time information server through the communication network; stores in a memory unit the router's address and a current time indicated by the time information; and (1) in the case where a current-time-storing-is-stopped period is equal to or greater than a threshold value, or (2) in the case where the current-time-storing-is-stopped period is less than the threshold value and is equal to or greater than another threshold value, and an address just received from the router is different from the address stored in the memory unit, transmits a control signal for stopping the transmission of the wireless signal.

8 Claims, 8 Drawing Sheets

(51) Int. Cl.
    *H04W 8/24*     (2009.01)
    *H04W 24/02*    (2009.01)
    *H04W 4/22*     (2009.01)
    *H04W 4/02*     (2009.01)
    *H04W 64/00*    (2009.01)
    *H04W 84/04*    (2009.01)
    *H04W 88/08*    (2009.01)

(52) U.S. Cl.
    CPC . *H04W 4/02* (2013.01); *H04W 4/22* (2013.01); *H04W 64/003* (2013.01); *H04W 84/045* (2013.01); *H04W 88/08* (2013.01)

(56) References Cited

U.S. PATENT DOCUMENTS

2008/0106342 A1* 5/2008 Okamoto et al. ............... 331/18
2010/0157825 A1* 6/2010 Anderlind et al. ............ 370/252
2013/0016609 A1* 1/2013 Hayakawa et al. ........... 370/230

FOREIGN PATENT DOCUMENTS

| | | |
|---|---|---|
| JP | 2002 9686 | 1/2002 |
| JP | 2008 22524 | 1/2008 |
| JP | 2010 507963 | 3/2010 |
| JP | 2010 161638 | 7/2010 |
| JP | 2010 199797 | 9/2010 |
| JP | 2011 30080 | 2/2011 |

OTHER PUBLICATIONS

International Search Report Issued Jun. 26, 2012 in PCT/JP12/064002 Filed May 30, 2012.

* cited by examiner

FIG.5

| CURRENT TIME |
|:---:|
| ⋮ |
| 14:10 |
| 14:11 |
| 14:12 |
| 18:15 |
| 18:16 |
| 18:17 |
| ⋮ |

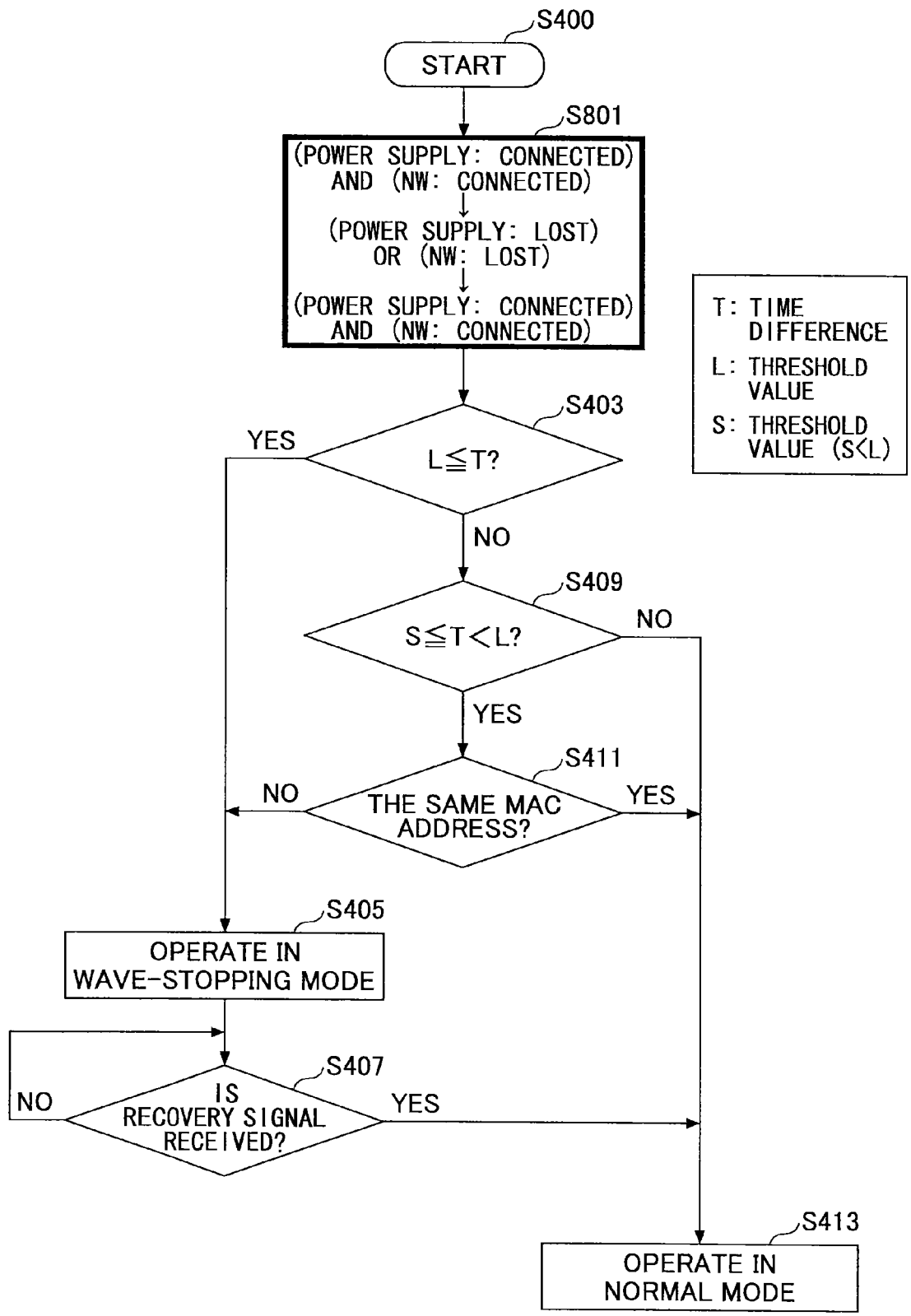

BASE STATION IN MOBILE COMMUNICATION SYSTEM AND WAVE STOPPING METHOD

TECHNICAL FIELD

The present invention relates to a base station in a mobile communication system and a wave stopping method.

BACKGROUND ART

In a mobile communication system, a mobile station performs wireless communications within an area covered by a base transceiver station (BTS). The area covered by a base transceiver station is called a cell, and the size of the cell varies from big to small. Note that in the following description, a cell is a concept that includes a sector. Depending on the size of the area that the cell covers, the cell, in general, can be classified as follows: a macro cell that covers an area with a radius of an order of several tens of kilometers; a micro cell, whose coverage area is smaller than the macro cell, that covers an area with a radius of an order of several kilometers; a pico cell, whose coverage area is further smaller than the micro cell, that covers an area with a radius of an order of several hundreds of meters; a femto cell, whose coverage area is further smaller than the pico cell, that covers an area with a radius of equal to or less than several tens of meters; etc. The femto cell covers a relatively narrow area such as a building or a specific place. However, the femto cell according to the present invention, not depending on this kind of classification, refers to an area that any base transceiver station a user is able to install or relocate (a femto base transceiver station or a femto cell base transceiver station) covers.

FIG. 1 shows a situation in which femto cells and macro cells are mixed. A base transceiver station of a femto cell (femto BTS) transmits a signal with lower power compared to a base transceiver station of a macro cell (macro BTS) so that the femto cell, in general, covers a smaller area than the macro cell. The macro cell base transceiver station is systematically introduced to each area for establishing an area not by an ordinary user but by a specific operator. On the other hand, the femto base transceiver station, in addition to being less expensive compared to the macro base transceiver station, is capable of being easily installed or relocated by the ordinary user.

One of the advantages of the femto cell is that it can improve the area. For example, an area in a dead zone can be easily improved. Because a macro base transceiver station transmits a signal with relatively strong power, once the macro based transceiver station is installed, there occurs a possibility for a neighboring cell to receive interference. On the other hand, because transmission power of a femto cell is low, the interference between the cells is not so much a concern as it is in the case of the macro cell. Therefore, compared to a macro base transceiver station, a femto base transceiver station is easier to be introduced and is especially advantageous for improving an area in a dead zone. Another advantage of the femto cell is off-loading, which is achieved by moving a part of traffic in the micro cell to the femto cell. Therefore, it becomes possible for a user to receive excellent services by promoting the use of the femto base transceiver station.

In the meantime, a user sometimes performs communication which uses location information of the base transceiver station. Such communication includes a case where a user performs emergency communication. The emergency communication is communication with a police station, a fire station, etc. When a user makes a call for emergency communication and an emergency communication signal reaches a network through a base transceiver station, the network identifies an appropriate communication station (corresponding police station, fire station, etc.,) based on the location information of the base transceiver station and transfers the emergency communication signal to the communication station. In the case where the base transceiver station is a macro base transceiver station, the location information is controlled by an operator and an appropriate communication station can be selected. On the other hand, in the case where the base transceiver station is a femto base transceiver station, there occurs a problem. The reason is that regarding the femto base transceiver station, it can be easily relocated by the user. For example, suppose that, in the case where a femto base transceiver station installed in the first location is relocated in the second location which is far away from the first location, the operator is not aware of the second location after the relocation. If the user makes a call for emergency communication through the femto base transceiver station relocated in the second location, then the operator selects a communication station based on the first location before the relocation and the emergency communication signal ends up being transferred to that communication station. In this case, the user ends up talking with an inappropriate communication station (police station, fire station, etc.) which is geographically far away from the user and it is a concern that it will take time before the user is able to talk with an appropriate communication station.

One of the methods for dealing with this kind of problem is to prevent the user from relocating freely even if it is a femto base transceiver station. A method can be considered, for example, to make a hole on the wall and fix the femto base transceiver station. This method may solve the above problem accompanying the relocation, but it will, in addition to creating a limitation in installation location of the femto base transceiver station, increase the possibility of a user rejecting the installation of the femto base transceiver station and create a problem of preventing the promotion of the femto base transceiver station.

Another method for dealing with the problem accompanying the relocation is to automatically determine the location after the relocation in order to prevent the emergency communication signal being transferred to an inappropriate communication station. This technique is described in Patent Document 1. In the case of this method, the femto base transceiver station after the relocation performs scanning around and reports a list of neighbor macro base transceiver stations to an upper control apparatus (femto RNC), and the upper control apparatus identifies the location of the femto base transceiver station (FIG. 2, paragraph 0025, etc., in Patent Document 1)

RELATED ART DOCUMENT

[PATENT DOCUMENT 1] Japanese Patent Application Publication No. 2010-507963

SUMMARY OF THE INVENTION

Problem to be Solved by the Invention

In the method described in Patent Document 1, however, it cannot be determined whether the femto base transceiver station is properly relocated or not and it is possible for the femto base transceiver station to be improperly relocated and used.

It is an object of the present invention to prevent negative effects based on inappropriate location information accompanying the relocation of the femto base transceiver station by the user.

Means for Solving the Problem

A base transceiver station according to an embodiment of the present invention is a base transceiver station in a mobile communication system. The base transceiver station includes a wireless communication unit configured to transmit and receive a wireless signal with a user apparatus in a cell; a network communication unit configured to, in the case where the base transceiver station is connected to a router through a communication network, obtain an address of the router, and periodically receive time information from a time information server through the communication network; a memory unit configured to store the address of the router and a current time indicated by the time information; and a control unit configured to, (1) in the case where a period in which the recording of the current time is stopped is equal to or greater than a threshold value or (2) in the case where the stopped period is less than the threshold value and equal to or greater than another threshold value that is different from the threshold value and the address just obtained from the router is different from the address stored in the memory unit, transmit to the wireless communication unit a control signal which causes the transmission of the wireless signal by the wireless communication unit to stop.

Effect of the Present Invention

According to the present embodiment, even if the relocation of the femto base transceiver station by the user is performed, stopping the wireless signal (wave stopping) transmission can be appropriately performed and negative effects based on the inappropriate location information can be prevented.

BRIEF DESCRIPTION OF THE DRAWINGS

FIG. 5 is drawing illustrating a situation in which current times are periodically recorded after the periodic current time recording was suspended.

FIG. 8 is a flowchart illustrating an example of operations according to another modified embodiment.

EMBODIMENTS FOR CARRYING OUT THE INVENTION

In a base transceiver station according to the present embodiment, (1) in the case where connection with an external power supply is lost for as long a period as it is assumed that the base transceiver station is relocated, or (2) in the case where the stopped period of the external power supply is not long and the router's address is changed, transmission of a wireless signal is stopped until an external recovery signal is received. The wireless signal, whose transmission is stopped, is a control signal that enables wireless access by a user apparatus, and is specifically a pilot signal, a notification signal, etc. When the transmission of the wireless signal is stopped, the user apparatus becomes unable to access the base transceiver station. After the transmission of the wireless signal is stopped, in the case where an operator is able to confirm, by on-site confirmation, telephone confirmation, etc., that the base transceiver station is not relocated, or that the base transceiver station is properly relocated, a recovery signal is transmitted to the base transceiver station by the operator. By this, the base transceiver station becomes able to resume transmission and reception of the wireless signal and the user apparatus becomes able to access the base transceiver station. A case, in which the base transceiver station is used while it is improperly relocated, can be effectively prevented because the base transceiver station autonomously stops transmission of the wireless signal in the case where it is recognized that there is a possibility that the base transceiver station is relocated (in the case of (1) or (2)). In the case where an operator is able to confirm that the base transceiver station is properly relocated, communication stations corresponding to the base transceiver station such as a police station, a fire station, etc., are updated and a routing table in the communication network of the operator is updated. By this, it becomes possible that, through the properly relocated base transceiver station, emergency communication, for example, is properly performed.

The present embodiment will be described from the following viewpoints.
1. System
1. 1 Femto cell
1. 2 Communication network
2. Femto base transceiver station
3. An example of operations
4. A modified embodiment Embodiment 1

<1. System>

Figure 2:
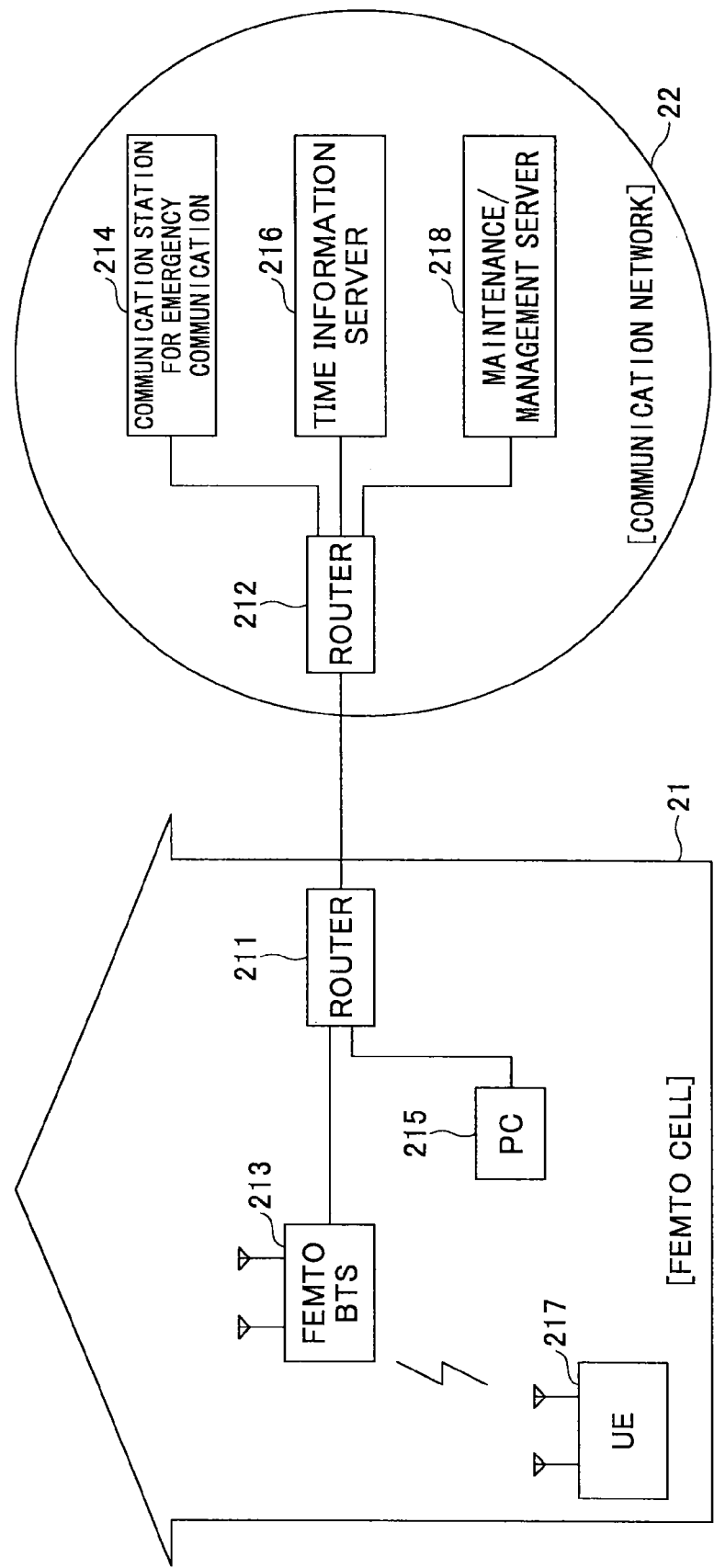
FIG. 2 is a drawing illustrating an overview of a communication system used in an embodiment.

FIG. 2 shows an overview of a communication system used in the present embodiment. In FIG. 2, of various nodes, processing units, and entities included in the communication system, those especially related to the present embodiment are shown. A femto cell 21 and a communication network 22 are connected in such a way that the femto cell 21 and the communication network 22 can communicate with each other. The femto cell 21 is a cell of a femto base transceiver station, which can be installed or relocated by a user, and is, for example, a communication area for the user's exclusive use at home.

<<1. 1 Femto Cell>>

In the femto cell 21, there exist a router 211, a femto base transceiver station (femto BTS) 213, a personal computer (PC) 215 and a user apparatus (UE) 217.

The router 211 is connected to the femto base transceiver station 213, the personal computer 215 and the communication network 22 in such a way that it enables the femto base transceiver station 213 or the personal computer 215 to communicate with the communication network 22; and is capable of transferring or routing communication signals.

The femto base transceiver station (femto BTS) 213 is connected to the router 211 in such a way that it can communicate with the router 211, and is capable of performing wireless communication with the user apparatus 217. The user is capable of installing the femto base transceiver station 213 in a place which is decided by the user, and is capable of relocating it as necessary. The femto base transceiver station 213, the same as a macro base transceiver station, transmits and receives a wireless signal with the user apparatus 217 and transmits to the router 211 a communication signal from the user apparatus 217 or receives from the router 211 the communication signal to the user apparatus. The femto base transceiver station 213 is capable of performing operations described in "3. An example of operations". Before starting its communications through some communication network, the femto base transceiver station 213 obtains a MAC address of the connected router 211 from the router 211. In the case where the femto base transceiver station 213 is relocated, usually, the connected router 211 is also changed. In this case, the MAC address of the router after the relocation is obtained by the femto base transceiver station and the MAC address of the connected router 211 stored in the femto base transceiver station 213 is changed.

The personal computer (PC) 215 is connected to the router 211 in such a way that it can communicate with the router 211. To the router 211, any communication apparatus other than the femto base transceiver station 213 may be connected. Therefore, the personal computer 215 is just an example of such a communication apparatus. Before starting its communications through some sort of communication network, the personal computer 215 obtains the MAC address of the connected router 211 from the router 211 too.

The user apparatus (UE) 217 may be any appropriated communication apparatus, which is capable of communicating through the femto base transceiver station 213. The user apparatus 217 is, typically, a mobile station, but may be a fixed station. The user apparatus 217 is, specifically, but not limited to, a mobile telephone, an information terminal, an advanced mobile telephone, a smart phone, a tablet type computer, a personal digital assistant, a portable personal computer, a stand-alone computer, etc. In an example shown in the figure, the user apparatus 217 is shown as a mobile station and the personal computer 215 is a fixed terminal. In the broad sense of the term, both the user apparatus (UE) 217 and the personal computer (PC) 215 can be referred to as "user apparatuses" as long as they perform wireless communication with the femto base transceiver station 213.

<<1. 2 Communication Network>>

In the meantime, in the communication network 22, there exist at least a router 212, a communication station for emergency communication 214, a time information server 216 and a maintenance/management server 218.

The communication network 22 is a communication network operated by an operator that provides a communication service to the user. The communication service may provide a service for any appropriate kind of communication signal. Such a communication signal includes, but is not limited to, a signal of audio communication, data communication, etc. In the present embodiment, specifically, a communication signal for emergency communication (an emergency communication signal) is communicated. The emergency communication is communication with a police station, a fire station, etc., at an emergency.

The router 212, in order to allow the user to communicate through the communication network, transfers the communication signal referring to a routing table. The router 212 transmits the communication signal from the communication station for emergency communication 214 or one of the servers 216, 218 to the user apparatus 217 (through the router 211 and the femto base transceiver station 213). Also, the router 212 transmits the communication signal from the user apparatus 217 to the communication station 214 or the server 216 or 218. For the sake of the drawing simplicity, only one communication station 214 and two servers 216 and 218 are shown, but the number or the type of nodes that communicate through the communication network can be any number or type. In the case where a communication signal is for emergency communication from the user apparatus 217, the router 212 transfers the emergency communication signal to the communication station 214 which is identified by the location information of the base transceiver station (the femto base transceiver station 213 in an example shown in the figure) through which the communication signal has arrived. Based on the location information of the base transceiver stations (including the macro base transceiver station and the femto base transceiver station), the communication stations 214 such as a police station, a fire station, etc., are associated with the base transceiver stations. The location of the macro base transceiver station is fixed, but there is a possibility that the location of the femto base transceiver station 213 has changed. In the case where the femto base transceiver station 213 has been relocated, if the operator can confirm that the femto base transceiver 213 is properly relocated, then an appropriate communication station 214 is associated with the femto base transceiver station 213 after the relocation and the transfer destination in the routing table is updated as necessary.

The communication station for emergency communication 214 is a communication station corresponding to emergency communication from the user, and specifically is, but not limited to, a police station, a fire station, a disaster control center, a security company, etc. Each of the communication stations for emergency communication 214 is, based on the location information of the base transceiver station, associated with any one of the base transceiver stations. One or more base transceiver stations may be associated with one communication station 214.

The time information server 216 is a server which obtains or generates accurate time information from an accurate information source such as the Global Positioning System (GPS), an atomic clock, etc., and provides the accurate time information to a node. As an example, the time information server 216 is a server that operates according to the Network Time Protocol (NTP), obtains time information from the atomic clock, and provides it to the node that needs it. The time information server 216 provides the time information at a predefined frequency or cycle. Therefore, by receiving this kind of time information periodically, the node can synchronize with the accurate time.

The maintenance/management server 218 is a server that performs maintenance, management, establishment, operations, etc., of the communication service via the communication network 22. The maintenance/management server 218, especially in the present embodiment, determines whether the femto base transceiver station is relocated and determines whether it is properly relocated in the case where it is relocated. As an example, the maintenance/management server 218 functions as an operation system of the femto base transceiver station (F-OPS). As will be described below, in the case where the femto base transceiver station 213 detects by itself the possibility that it has been relocated and stops by itself transmitting the wireless signal (in the case where the wave is stopped), the fact that the wave is stopped may be automatically reported from the femto base transceiver station 213 to the maintenance/management server 218, or may be reported by the user. The maintenance/management server 218, in the case where the femto base transceiver station 213 has not been relocated or it has been properly relocated, transmits a recovery signal to the femto base transceiver station 213. The femto base transceiver station 213, which has received the recovery signal, resumes the wireless signal transmission. In the case where the femto base transceiver station 213 has been properly relocated, an appropriated communication station 214 is associated with the femto base transceiver station 213 after the relocation, and the transfer destination in the routing table is updated as necessary. After the femto base transceiver station 213 stops the wireless signal transmission, in the case where neither the femto base transceiver station 213 has not been relocated nor the femto base transceiver station 213 has been properly relocated, the maintenance/management server 218 does not transmit the recovery signal. In this case, the femto base transceiver station 213 stays in a state in which the wireless signal transmission is stopped.

Note that the maintenance/management server 218 also controls values of various parameters which are used in the femto base transceiver station 213. For example, the maintenance/management server 218 updates values of the first threshold L and the second threshold S, and transmits the updated values to the femto base transceiver station 213.

<2. Femto Base Transceiver Station>

Figure 3:
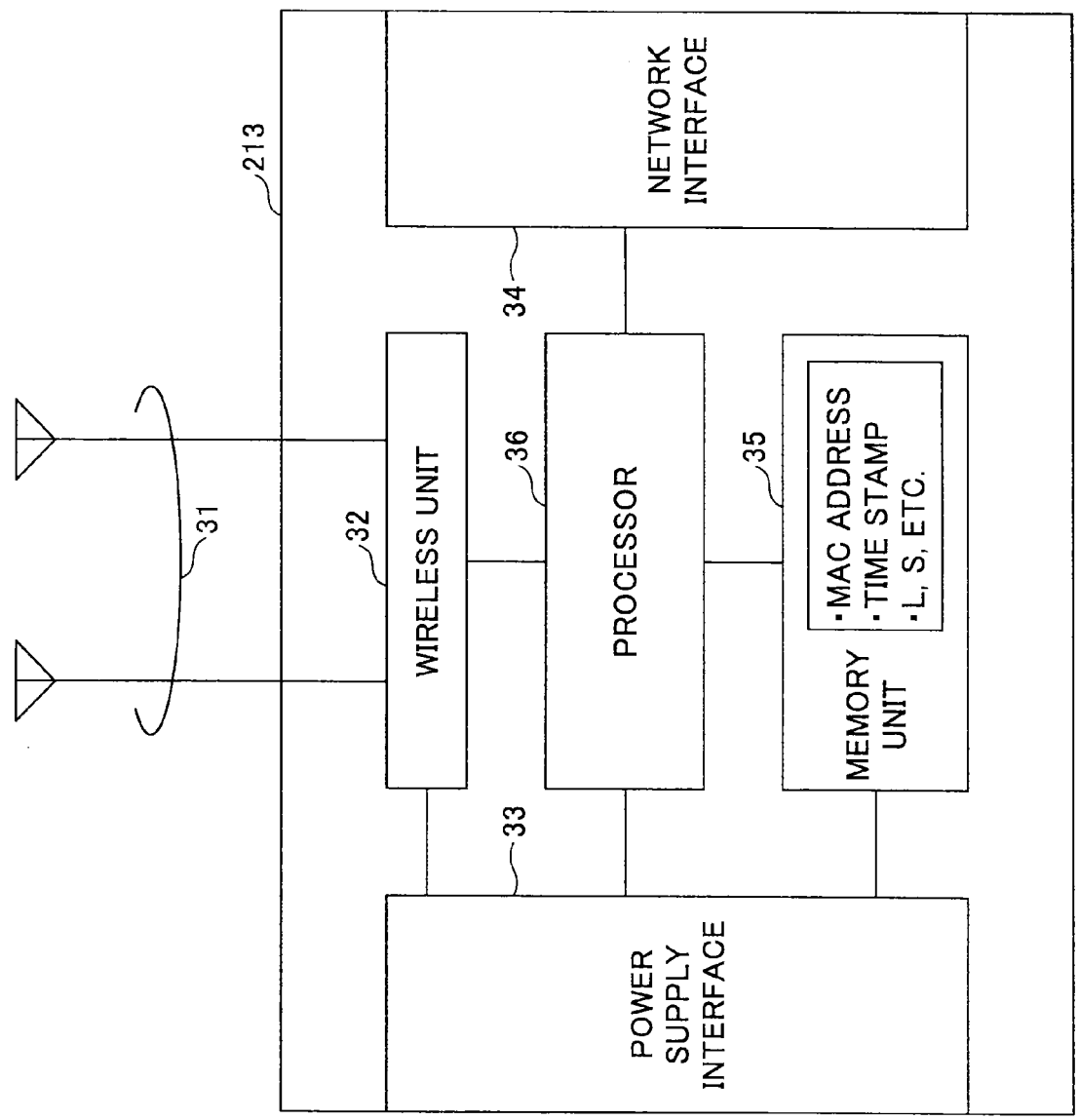
FIG. 3 is a general block diagram of a femto base transceiver station shown in FIG. 2.

FIG. 3 is a general block diagram of the femto base transceiver station 213 as shown in FIG. 2. In FIG. 3, of various elements or processing units included in the femto base transceiver station 213, those especially related to the present embodiment are shown. The femto base transceiver station includes at least an antenna 31, a wireless unit 32, a power supply interface 33, a network interface 34, a memory unit 35 and a processor 36.

The antenna 31 is used for performing wireless communications with the user apparatus (UE) 217. Two antennas are shown, but the number of the antennas can be any number.

The wireless unit 32 processes wireless signals to be transmitted and received to and from the user apparatus, and transmits and receives them via the antenna 31. The transmitted wireless signals include a pilot signal, a notification signal, a control signal such as a synchronization signal, a traffic signal, etc. For example, a signal for emergency communication from a user is transmitted. The received wireless signals include a traffic signal and a control signal for the user apparatus, and the control signal includes, for example, a recovery signal which causes the femto base transceiver station 213 to return from a wave-stopping state to a normal state. The wave-stopping state is a state in which the wireless signal transmission is stopped. The normal state is a state in which the wireless signal is properly transmitted.

The power supply interface 33 transforms a form of electric energy from the power supply outside of the femto base transceiver station 213 to the form that is appropriate to be used in the femto base transceiver station 213, and provides the power to various processing units. As an example, the form of electric energy from the external power supply has an alternating current and the form that is appropriate to be used in the femto base transceiver station 213 has a direct current of a low voltage.

The network interface 34 is an interface for communication signals communicated through the communication network 22. Therefore, communications between various communication stations or servers and the femto base transceiver station 213 are performed through the network interface 34.

The memory unit 35 stores values of various data or parameters that are needed for operations by the femto base transceiver station 213, and adds, modifies or updates the values as necessary. In the memory unit 35, for example, current times indicated by the time information periodically received from the time information server 216, a MAC address of the router to which the femto base transceiver is connected, and threshold values L and S which are used for evaluating the time difference T to be described later, are stored. The periodically received time information is stored in the memory unit 35 each time it is received. In the case where the femto base transceiver station 213 is relocated, in general, the router to be connected to the femto base transceiver station 213 is also changed, and the MAC address of the router after the change is stored in the memory unit 35. The threshold values L and S may be maintained unchanged or may be dynamically adjusted by an instruction from the maintenance/management server 218.

The processor 36 controls operations of processing units in the femto base transceiver station 213. The processor 36 determines whether or not to stop the wireless signal transmission by the wireless unit 32 based on the determination result of whether the relocation is performed or not, and controls operations of the wireless unit 32. Note that the determination whether the relocation is performed or not may be made regardless of whether the relocation is actually performed or not. The reason is that it is for determining whether or not to cause the femto base transceiver station to be in the wave stopping state. The detailed operations of the processor 36 will be described below.

<3. An Example of Operations>

Figure 4:
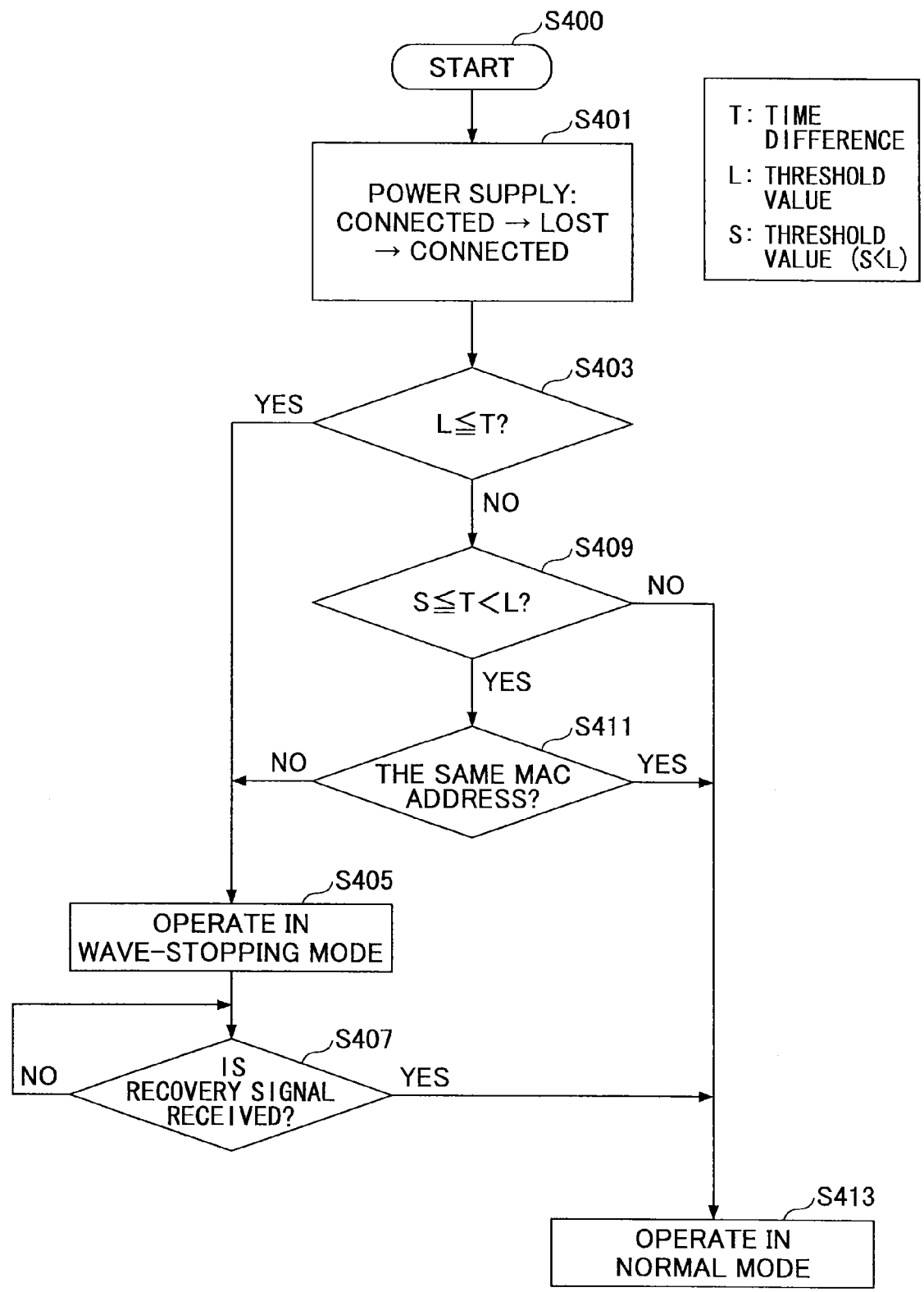
FIG. 4 is a flowchart illustrating an example of operations of the femto base transceiver station shown in FIG. 3.

FIG. 4 is a flowchart illustrating an example of operations of the femto base transceiver station 213 shown in FIG. 3. The flow starts from step S400 and moves to step S401.

Figure 1:
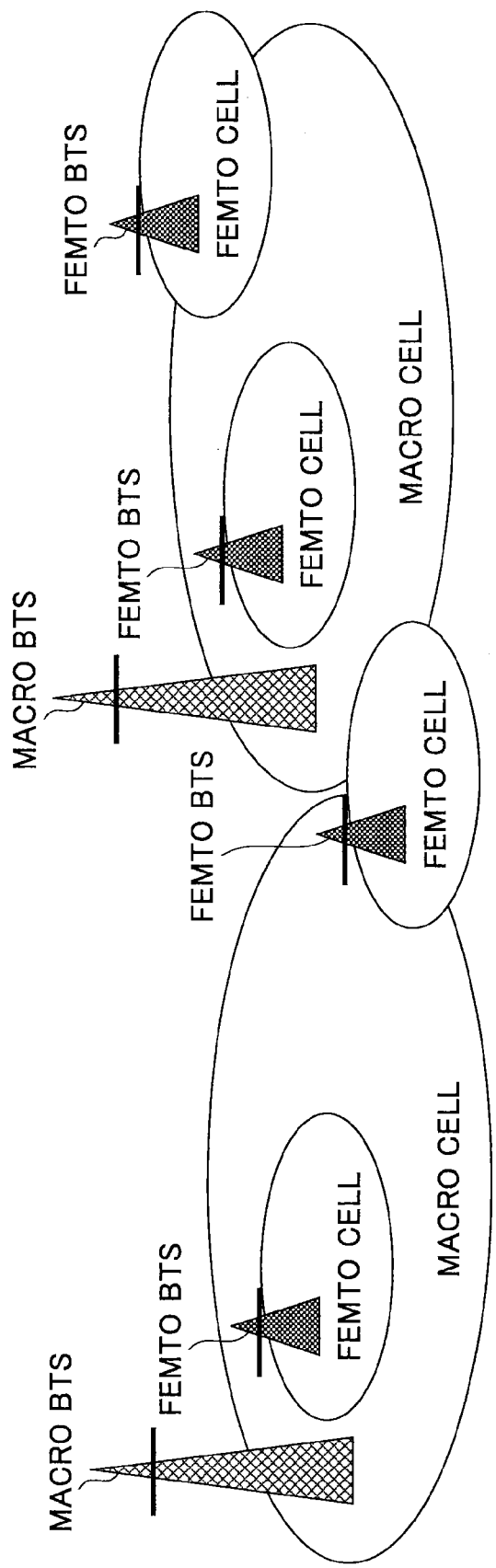
FIG. 1 is a drawing illustrating a situation in which femto cells and macro cells are mixed.

In step S401, in the case where the femto base transceiver station 213 is connected to the external power supply, the connection with the external power supply is lost for some reason. In the case where the external power supply is connected, the femto base transceiver station 213 stores the current time in the memory unit 35 (FIG. 2) each time it periodically receives the time information from the time information server 216 (FIG. 1). When the external power supply is lost, the power supply to the wireless unit 32, the network interface 34, the memory unit 35 and the processor 36 is lost, and the storing of the current time is stopped. As a result, in the memory unit 35, the current time that was received just before the external power supply loss remains stored. This state is different from a state in which the operation switch of the femto base transceiver station 213 is turned OFF while it is still connected to the external power supply, that is, a state in which the operational switch of the femto base transceiver station 213 is switched to OFF in a state where the external power supply is connected to the power supply interface 33. The reason is that in the case where the operational switch is only switched to OFF, the power is still supplied to the base transceiver station 213 from the external power supply and the storing of the current time is continued.

When the external power supply is reconnected to the femto base transceiver station 213 after the external power supply loss, the power supply to the wireless unit 32, the network interface 34, the memory unit 35 and the processor 36 is resumed and the storing of the current time is also resumed.

Figure 5:
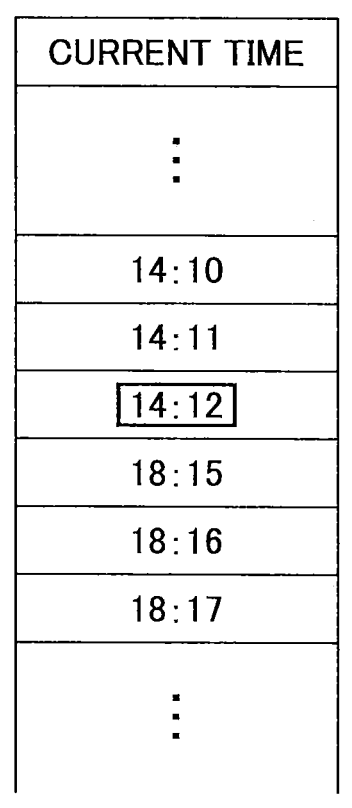

FIG. 5 shows a situation in which the storing of the current time into the memory unit 35 was stopped after the periodic storing, then the periodical recording has been resumed. For the sake of convenience, it is assumed that the time information from the time information server 216 can be received every one minute, but this is not essential and the time information may be obtained at any appropriate frequency. In the case of an example shown in the figure, as a result of losing the external power supply after the current times were stored at "14:10", "14:11" and "14:12", the time "14:12" remains as the newest time. After that, the external power supply is connected and the current time has been updated since "18:15". In the case where the external power supply is connected in this way, the femto base transceiver station 213 calculates the time difference T between the current time indicated by the time information just obtained by the network interface 34 and the current time stored in the memory unit 35. In the case of the example shown in FIG. 5, T=(18:15)−(14:12)=(04:03). Therefore, the time difference T indicates a period in which the periodic storing of the current time was stopped.

Furthermore, when the external power supply is connected, the femto base transceiver station 213 obtains the MAC address of the connected router.

In step S403 in FIG. 4, the femto base transceiver station 213 (the processor 36) determines whether the time difference T is a large number which is equal to or greater than the first threshold value L. The first threshold value L is set a value which is an expected period for which the external power supply is supposed to be lost in the case where the femto base transceiver station is being relocated. As an example, L=4 hours. The specific value of L can be any number. In the case where the time difference T is equal to or greater than L, the flow moves to step S405. In the case where the time difference T is less than L, the flow moves to step S409. In the case of the current example, because the time difference T is 4 hours and 3 minutes (L<T), the flow moves to step S405.

In step S405, the processor 36 of the femto base transceiver station 213 transmits to the wireless unit 32 a control signal instructing to stop the wireless signal transmission. By this, the transmission of the pilot signal, the notification signal, etc., from the femto base transceiver station 213 is stopped and the user apparatus 217 becomes unable to access the femto base transceiver station 213. The femto base transceiver station 213, in the case where it has come to be in an operating mode in which the wireless signal transmission is stopped (wave-stopping mode or wave-stopping state), may autonomously report the same to the maintenance/management server 218 (FIG. 2), which is not mandatory. The femto base transceiver station 213 may report to the maintenance/management server 218 that the femto base transceiver station 213 does not operate in a normal operating mode (normal mode or normal state), or, the user, being prompted by an LED lamp, a buzzer, etc., of the femto base transceiver station 213, may report the operating mode of the femto base transceiver station 213 to the operator by telephone, etc.

In step S407, the femto base transceiver station 213, which is now in a wave-stopping mode, waits for a recovery signal from the maintenance/management server 218. In the case where the femto base transceiver station 213 comes to not be operating in the normal mode, the maintenance/management server 218 receives reports of the same from the femto base transceiver station 213 automatically or from the user. In response to the report, the maintenance/management server 218, or the operator, determines whether the femto base transceiver station 213 has been relocated, and, in the case where it has been relocated, determines whether the relocation is properly performed by visiting the site or by telephone. The method of the checking is not limited to the above, but may be other methods. Regarding the case of visiting the site, the operator may determine whether the femto base transceiver station 213 has been relocated or not by getting information about the address of the installation location of the femto base transceiver station 213. In the case of the proper relocation, in general, a communication service contract for the location before the relocation becomes cancelled and there exists a communication service subscription contract for the relocated location. Therefore, whether it is properly relocated or not may be determined, as an example, by checking existence/non-existence of such a valid contract. In any case, in the case where the operator has successfully confirmed in one way or another that it is not relocated, or that it is properly relocated, the operator transmits a recovery signal to the femto base transceiver station 213, and the flow moves to step S413. The recovery signal is a control signal for causing the operating mode of the femto base transceiver station 213 to switch from the wave-stopping mode to the normal mode. In this way, in step S407, the femto base transceiver station 213 waits for the recovery signal.

Note that in the case where it is confirmed that it has been properly relocated, a communication station for emergency communication is associated with the femto base transceiver station 213 based on the location of the femto base transceiver station 213 after the relocation, and the routing table in the communication network 22 is updated.

In the meantime, in step S403, in the case where the time difference T is not equal to or greater than the first threshold value L, the flow moves to step S409.

In step S409, it is determined whether the time difference T is equal to or greater than the second threshold value S. In other words, it is determined whether the time difference T is equal to or greater than S and less than L. The second threshold value S is set a value which is a period expected to be too short for performing the relocation. As an example, S=1 hour. The specific value of S can be any number. In the case where the time difference T is equal to or greater than the second threshold value S, the flow moves to step S411, and in the case where the time difference T is not equal to or greater than the second threshold value S (in the case where T is less than S), the flow moves to step S413.

In step S411, it is determined whether the address the base transceiver station 213 has just obtained from the router is the same as the address stored in the memory unit 35. In the case where the femto base transceiver station 213 is relocated, in general, the connected router is changed and the MAC address becomes not the same as the stored MAC address. Therefore, in the case where the address is not the same as the stored address, because there is a high probability that the relocation has been performed, the flow moves to step S405, the operating mode of the femto base transceiver station 213 moves to the wave-stopping mode, and the described operations are performed. In the case where the just obtained MAC address is the same as the stored one, the flow moves to step S413.

In step S413, the femto base transceiver station 213 operates in the normal mode. In other words, the femto base transceiver station 213 transmits in the femto cell a control signal such as a pilot signal, a notification signal, etc., so that the user apparatus can access the femto base transceiver station 213.

After step S413, in the case where the external power supply is connected after its loss, the flow returns to step S403 (not shown in the figure), and the described processes are performed.

Figure 6:
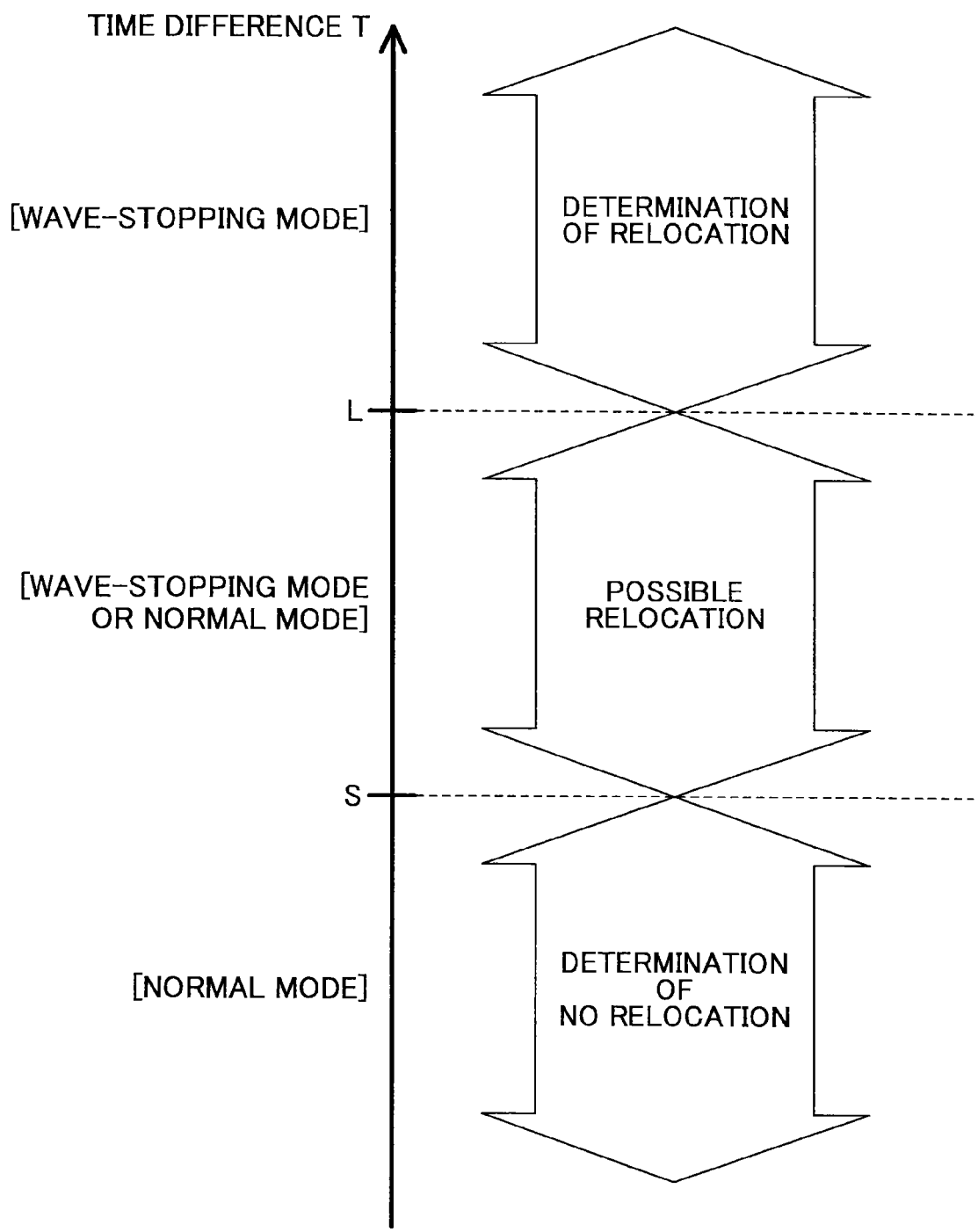
FIG. 6 is a drawing illustrating the relationship between operating modes of the femto base transceiver station and threshold values L and S.

FIG. 6 shows a summarized relationship between the operating mode of the femto base transceiver station 213 and the threshold values L and S. In the case where the time difference T which indicates a period during which the periodic current time storing is stopped is equal to or greater than the first threshold value L, the period T during which the periodic current time storing is stopped is fairly long. In this case, because there is a high probability that the relocation has been performed, the operating mode of the femto base transceiver station 213 becomes the wave-stopping mode. On the other hand, in the case where the time difference T is less than the second threshold value S, because there is a low probability that the relocation has been performed, the operating mode of the femto base transceiver station 213 becomes the normal mode. In the case where the time difference T is less than the first threshold value L and equal to or greater than the second threshold value S, it is difficult to determine the probability of relocation only from the time T which indicates a period during which the periodic current time storing is stopped. Therefore, it is determined whether the probability of relocation is high or not based on whether the router, which is connected to the femto base transceiver station 213, is changed or not. In the case where the MAC address of the router is changed, because there is a high probability that the relocation has been performed, the operating mode of the femto base transceiver station 213 becomes the wave-stopping mode. In the case where the MAC address of the router has not changed, because there is a low probability that the relocation has been performed, the operating mode of the femto base transceiver station 213 becomes the normal mode. Note that in the case where it is determined that there is a high probability that the relocation has been performed, it does not matter whether the relocation has actually been performed or not. The reason is that the determination is for determining whether to cause the femto base transceiver station 213 to be in the wave-stopping mode or not.

<4. A Modified Embodiment>

In the above, the present invention has been described referring to specific embodiments, but those embodiments are just examples and a person skilled in the art would easily understand various modified embodiments, amended embodiments and replacement embodiments.

In an example described above, the cases in which it is determined that there is a high probability that the relocation has been performed are (1) a case where the time difference T is equal to or greater than the first threshold value L and (2) a case where the time difference T is equal to or greater than S and T is less than L and the MAC address of the router is changed. The time difference T is calculated as a period during which the periodic storing of the current time in the memory unit 35 is stopped.

The periodic current time storing is stopped not only in the case where the external power supply, which is connected to the femto base transceiver station 213, is lost as shown in the above example; but also in the case where the connection to the time information server 216 is lost. The reason is that in this case, the periodic time information from the time information server 216 becomes unavailable even if the power is supplied to each of the processing units in the femto base transceiver station 213. Therefore, the above example of operations can be applied to the case where the connection between the femto base transceiver station 213 and the time information server 216 is connected again after it is lost.

Figure 7:
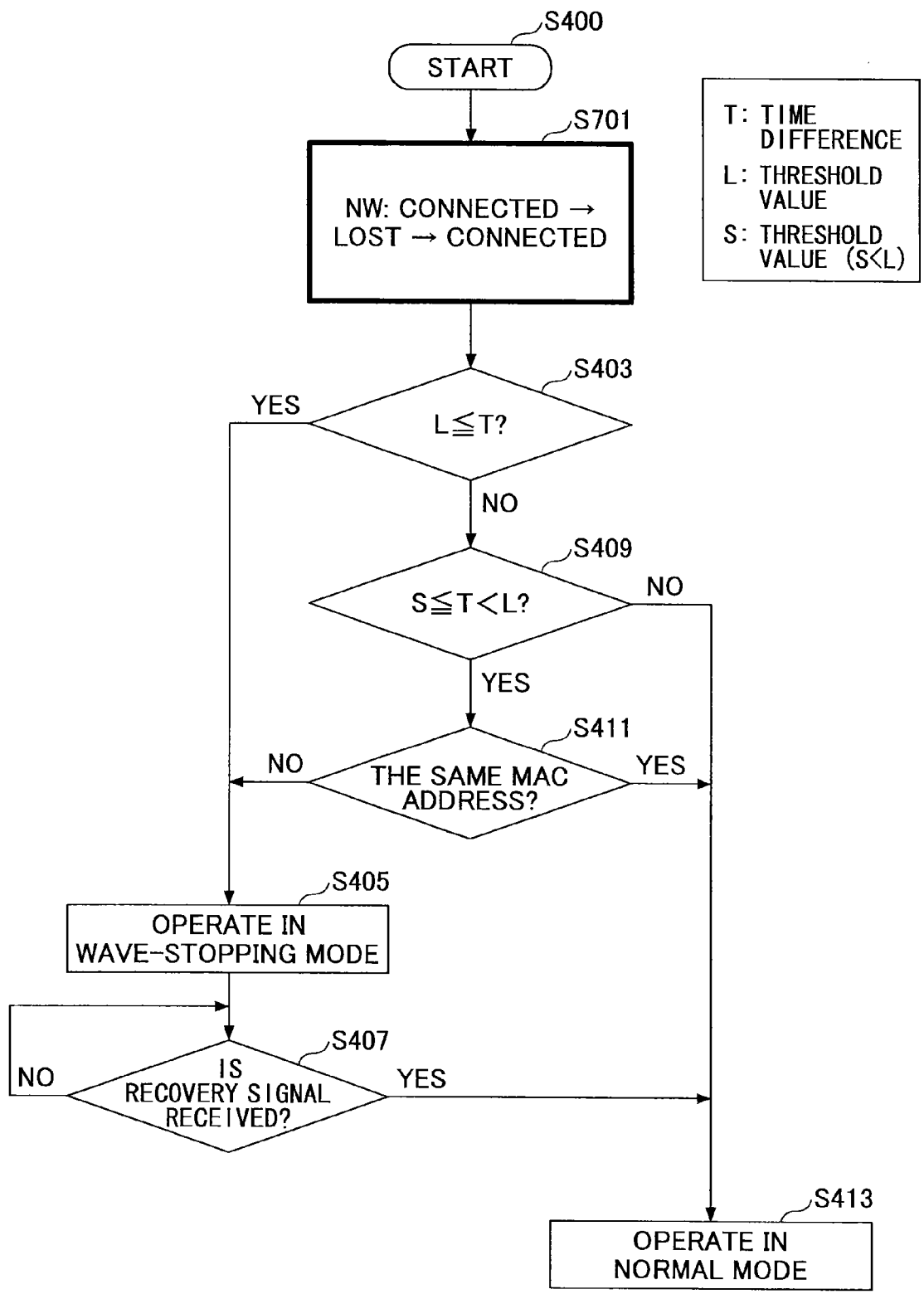
FIG. 7 is a flowchart illustrating an example of operations according to a modified embodiment.

FIG. 7 shows an operation according to a modified example from this kind of viewpoint. The operation is, in general, the same as the one shown in FIG. 4, but, in step S701, the time difference T is measured and the flow moves from step S701 to step S403 in the case where the connection to the time information server 216 is connected again after it is lost. Then, the described processes are performed.

It can be said that the periodic current time storing is stopped in the case where the external power supply is lost, or in the case where the connection to the network (the time information server) is lost. In other words, the periodic current time storing is not stopped but continued in the case where the external power supply is connected and the network is connected.

FIG. 8 shows an operation according to a modified example from this kind of viewpoint. The operation is, in general, the same as the one shown in FIG. 4, but the operation in step S801 is different. The time difference T is measured in the case where the state changes from a state in which both the external power supply and the network are connected to a state in which the connection to the external power supply or the connection to the network is lost, and changes again to a state in which both the external power supply and the network are connected. Then, the flow moves to step S403 and the described processes are performed.

In the meantime, the threshold values L and S (S<L), which are used in the case where the above time difference or wave-stopping time T is evaluated, may be maintained unchanged or may be changed in accordance with a situation. For example, in an environment where the femto base transceiver station 213 is installed, in the case where it is known beforehand that there is to be a blackout for X hours, it can be considered to increase both or one of the threshold values (especially, the first threshold value L) by X hours. It is preferable that this kind of threshold value control be performed by the maintenance/management server 218 (F-OPS). In this case, the change of the threshold value is reported by the maintenance/management server 218 to the femto base transceiver station 213, and the femto base transceiver station 213 updates the threshold values L and S that are stored in the memory unit 35.

The present embodiment can be applied to any communication signal that is communicated between the femto base transceiver station 213 and the user apparatus. The present embodiment is especially advantageous for a communication service in which the location information of the base transceiver station is used and the random or improper relocation of the base transceiver station causes an error. Such a communication service is typically, but is not limited to, an emergency communication service. For example, in the case where a combination of an identifier of a base transceiver station and a reception level near the base transceiver station is stored in a database in order to create an area map, the area map becomes unable to be created accurately if the reliability of the location information of the base transceiver station is reduced. The present embodiment, which controls relocation of base transceiver stations, can be applied to this kind of case.

The present embodiment may be applied to any appropriate mobile communication system which uses a femto base transceiver station. For example, the present embodiment may be applied to a W-CDMA scheme system, a HSDPA/HSUPA type W-CDMA scheme system, an LTE scheme system, an LTE-Advanced scheme system, an IMT-Advanced scheme system, or other systems.

For the sake of convenience, the present embodiments are described using specific numbers in order to facilitate understanding of the invention, but these numbers are used just as examples and, unless otherwise noted, any appropriate number can be used. Division of embodiments or items is not essential for the present invention, and things described in two or more items may be used in combination as necessary, or a thing described in an item may be applied to a thing described in a different item (as long as it does not conflict). For the sake of convenience, devices of the present embodiments are described using a functional block diagram, but those devices may be realized as hardware, software, or combination of both. The software may be provided in a Random Access Memory (RAM), a Flash memory, a Read-Only Memory (ROM), an EPROM, an EEPROM, a register, a hard disk (HDD), a removable disk, a CD-ROM, a database, a server, or any other memory media. The present invention is not limited to the above embodiments, and various variations and modifications may be made without departing from the spirit of the present invention.

The present application is based on and claims the benefit of priority of Japanese Priority Application No. 2011-127507 filed on Jun. 7, 2011, the entire contents of which are hereby incorporated by reference.

DESCRIPTION OF THE REFERENCE NUMERALS

21 Femto cell
211 Router
213 Femto base transceiver station (femto BTS)
215 Personal computer (PC)
217 User apparatus (UE)
22 Communication carrier network
212 Router
214 Communication station for emergency communication
216 Time information server
218 Maintenance/management server
31 Antenna
32 Wireless unit
33 Power supply interface
34 Network interface
35 Memory unit
36 Processor

The invention claimed is:

1. A base station in a mobile communication system, the base station comprising:
a wireless communication interface configured to transmit and receive a wireless signal with a user apparatus in a cell,
circuitry configured to, in the case where the base station is connected to a communication network through a router, obtain an address of the router, and periodically receive time information from a time information server through the communication network, and
a memory configured to store the address of the router and a current time indicated by the time information, wherein
the circuitry is configured to,
(1) in the case where a period during which the storing of the current time is stopped is equal to or greater than a threshold value,
transmit to the wireless communication interface a control signal for causing the wireless communication interface to stop the transmission of the wireless signal, and
(2) in the case where the stopped period is less than the threshold value and is equal to or greater than another threshold value, and an address just received from the router is different from the address stored in the memory,
transmit to the wireless communication interface a control signal for causing the wireless communication interface to stop the transmission of the wireless signal.

2. The base station as claimed in claim 1, wherein the circuitry is configured to:
(3) in the case where the stopped period is less than the threshold value and is equal to or greater than the other threshold value, and the address just received from the router is the same as the address stored in the memory,
transmit to the wireless communication interface a control signal for causing the wireless communication interface to stop the transmission of the wireless signal, and
(4) in the case where the stopped period is less than the other threshold value, transmit to the wireless interface the control signal for causing the wireless communication interface to perform the transmission of the wireless signal.

3. The base station as claimed in claim 1, wherein,
in the case where, after at least one of a connection to a power supply or a connection to the communication network of the base station is lost, the base station is connected to the power supply and to the communication network,
the circuitry is configured to measure the period during which the storing of the current time is stopped.

4. The base station as claimed in claim 1, wherein,
in the case where, after the circuitry transmits the control signal for causing the wireless communication interface to stop the transmission of the wireless signal, the circuitry receives a recovery signal from an operation system server through the communication network,
the circuitry transmits to the wireless communication interface the control signal for causing the wireless communication interface to perform the transmission of the wireless signal.

5. The base station as claimed in claim 1, wherein,
in order that an emergency communication signal received by the wireless communication interface is transferred to a communication station identified by location information of the base station,
the circuitry is configured to transmit the emergency communication signal to the communication network.

6. The base station as claimed in claim 1, wherein,
in the case where the control signal for causing the wireless communication interface to perform the transmission of the wireless signal is received,
the wireless communication interface transmits the wireless signal including at least one of a pilot signal and a notification signal.

7. A wave stopping method used by a base station including a wireless communication interface for transmitting and receiving a wireless signal with a user apparatus in a cell, the wave stopping method comprising:
a step of causing the base station to, in the case where the base station is connected to a communication network through a router, obtain and store the address of the router in a memory,
a step of causing the base station to periodically receive time information from a time information server through the communication network and to store a current time indicated by the time information in the memory, and
a step of,
(1) in the case where a period during which the storing of the current time is stopped is equal to or greater than a threshold value,
transmitting to the wireless communication interface a control signal for causing the wireless communication interface to stop the transmission of the wireless signal, and
(2) in the case where the stopped period is less than the threshold value and is equal to or greater than another threshold value, and an address just received from the router is different from the address stored in the memory, transmitting to the wireless communication interface a control signal for stopping the transmission of the wireless signal by the wireless communication interface.

8. The wave stopping method as claimed in claim 7, wherein,
(3) in the case where the stopped period is less than the threshold value and is equal to or greater than the other threshold value, and the address just received from the router is the same as the address stored in the memory,
transmitting to the wireless communication interface a control signal for causing the wireless communication interface to stop the transmission of the wireless signal, and
(4) in the case where the stopped period is less than the other threshold value,
transmitting to the wireless communication interface the control signal for causing the wireless communication interface to perform the transmission of the wireless signal.

\* \* \* \* \*